United States Patent
Choe et al.

(10) Patent No.: US 10,447,924 B2
(45) Date of Patent: Oct. 15, 2019

(54) CAMERA USAGE NOTIFICATION

(71) Applicant: Microsoft Technology Licensing, LLC, Redmond, WA (US)

(72) Inventors: Sang K. Choe, Redmond, WA (US); Mei Ling Wilson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/798,014

(22) Filed: Oct. 30, 2017

(65) Prior Publication Data

US 2019/0007605 A1 Jan. 3, 2019

Related U.S. Application Data

(60) Provisional application No. 62/527,167, filed on Jun. 30, 2017.

(51) Int. Cl.
*H04N 5/232* (2006.01)
*G06F 9/50* (2006.01)
*H04N 5/225* (2006.01)

(52) U.S. Cl.
CPC ....... *H04N 5/23225* (2013.01); *G06F 9/5011* (2013.01); *G06F 2209/503* (2013.01); *H04N 5/2258* (2013.01); *H04N 5/23245* (2013.01)

(58) Field of Classification Search
CPC .............. H04N 5/222; H04N 5/23203; H04N 5/23225; H04N 21/4435; G06F 9/50;

(Continued)

(56) References Cited

U.S. PATENT DOCUMENTS 6,909,457 B1 6/2005 Fukasawa
7,693,995 B2 * 4/2010 Kudo .................... G06F 9/5061
709/201

(Continued)

FOREIGN PATENT DOCUMENTS

EP 2290947 A1 3/2011

OTHER PUBLICATIONS

"Identifying the location of internal cameras (Windows Store device apps)", https://docs.microsoft.com/en-us/windows-hardware/drivers/devapps/identifying-the-location-of-internal-cameras, Published on: Apr. 20, 2017, 14 pages.

(Continued)

*Primary Examiner* — Kelly L Jerabek
(74) *Attorney, Agent, or Firm* — Arent Fox LLP

(57) ABSTRACT

Methods and devices for monitoring camera resource activities may include receiving a camera resource request from an application that identifies at least one camera resource being requested for use by the application. The methods and devices may include determining whether the camera resource is available for use by checking a state of the camera resource using a camera resource log that provides the state of the camera resource. The methods and devices may include granting access to the camera resource when the state of the camera resource is available for use and updating the state of the camera resource when access is granted to the camera resource. The methods and devices may include updating the camera resource log when access is granted to the camera resource with an application identification (ID) for the application using the camera resource and the state of the camera resource.

18 Claims, 5 Drawing Sheets

(58) Field of Classification Search
CPC ...... G06F 9/54; G06F 9/44505; G06F 9/5005;
G06F 9/5011; G06F 9/5016; G06F
9/5044; G06F 9/5055; H04L 29/08171;
H04H 20/42
See application file for complete search history.

(56) References Cited

U.S. PATENT DOCUMENTS

| | | | |
|---|---|---|---|
| 8,132,175 B2* | 3/2012 | Yoo | G06F 9/485 |
| | | | 455/418 |
| 8,520,999 B2 | 8/2013 | Squyres et al. | |
| 9,195,388 B2* | 11/2015 | Shepherd | G06F 3/0482 |
| 9,536,322 B1 | 1/2017 | Smith et al. | |
| 2003/0154233 A1* | 8/2003 | Patterson | G06F 9/50 |
| | | | 718/104 |
| 2005/0268302 A1 | 12/2005 | Geib et al. | |
| 2006/0050155 A1 | 3/2006 | Ing et al. | |
| 2007/0094668 A1* | 4/2007 | Jacquot | G06F 9/50 |
| | | | 718/104 |
| 2008/0136914 A1 | 6/2008 | Carlson et al. | |
| 2013/0262871 A1 | 10/2013 | Barrus et al. | |
| 2015/0124107 A1 | 5/2015 | Muriello et al. | |
| 2015/0256476 A1* | 9/2015 | Kurtzman | H04L 47/70 |
| | | | 709/226 |
| 2015/0331083 A1 | 11/2015 | Paz | |
| 2016/0004575 A1 | 1/2016 | Fink et al. | |
| 2016/0085654 A1* | 3/2016 | Khoury | G06F 11/3051 |
| | | | 710/17 |
| 2017/0181095 A1* | 6/2017 | Guennec | H04M 1/0264 |
| 2018/0146139 A1* | 5/2018 | Leung | H04N 5/2258 |

OTHER PUBLICATIONS

"International Search Report and Written Opinion Issued in PCT Application No. PCT/US18/034514", dated Aug. 21, 2018, 14 Pages.

* cited by examiner

28

| Camera Resource ID 18 | Application ID 12 | State 26 | Mode 14 |
|---|---|---|---|
| Web Camera | Skype | Active | Control |
| Front Camera | Authentication | Active | Share |
| Rear Camera | Coupon | Off | |
| ⋮ | ⋮ | ⋮ | ⋮ |

FIG. 3

CAMERA USAGE NOTIFICATION

RELATED APPLICATION

This application claims priority to U.S. Application No. 62/527,167 titled "Camera Usage Notification," filed Jun. 30, 2017, which is incorporated herein by reference in its entirety.

BACKGROUND

The present disclosure relates to image and video capture.

Generally, a computer device may indicate that an imaging device in communication with the computer device is currently in use by illuminating a light or other indicator. Such an indicator, however, only provides the user with a notice that the imaging device is generally in use. As such, there may be gaps in the information provided about imaging device usage.

Thus, there is a need in the art for improvements in information relating to image and video capture.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory and processor. The operating system may be operable to receive a camera resource request from an application that identifies at least one camera resource being requested for use by the application, determine whether the camera resource is available for use by checking a state of the camera resource using a camera resource log that provides the state of the camera resource, grant access to the camera resource when the state of the camera resource is available for use, update the state of the camera resource when access is granted to the camera resource, and update the camera resource log with an application identification (ID) for the application using the camera resource and the state of the camera resource.

Another example implementation relates to a method for monitoring camera resource activities. The method may include receiving, at an operating system executing on a computer device, a camera resource request from an application that identifies at least one camera resource being requested for use by the application. The method may also include determining whether the camera resource is available for use by checking a state of the camera resource using a camera resource log that provides the state of the camera resource. The method may also include granting access to the camera resource when the state of the camera resource is available for use. The method may also include updating the state of the camera resource when access is granted to the camera resource. The method may also include updating the camera resource log with an application identification (ID) for the application using the camera resource and the state of the camera resource.

Another example implementation relates to computer-readable medium storing instructions executable by a computer device. The computer-readable medium may include at least one instruction for causing the computer device to receive a camera resource request from an application that identifies at least one camera resource being requested for use by the application. The computer-readable medium may include at least one instruction for causing the computer device to determine whether the camera resource is available for use by checking a state of the camera resource using a camera resource log that provides the state of the camera resource. The computer-readable medium may include at least one instruction for causing the computer device to grant access to the camera resource when the state of the camera resource is available for use. The computer-readable medium may include at least one instruction for causing the computer device to update the state of the camera resource when access is granted to the camera resource. The computer-readable medium may include at least one instruction for causing the computer device to update the camera resource log with an application identification (ID) for the application using the camera resource and the state of the camera resource.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 3 is an example camera resource log in accordance with an implementation of the present disclosure;

DETAILED DESCRIPTION

This disclosure relates to devices and methods for monitoring the activities of camera resources in communication with a computer device. The devices and methods may provide a camera resource log that identifies camera resource processes operating on a computer device. Specifically, the camera resource log may identify one or more camera resources currently installed on the computer device, whether they are in use, and what applications may be using the camera resource(s). The camera resource log may also provide the mode of control of the application using each camera resource. For example, the camera resource log may indicate whether the application is in a control mode or whether the application is in a sharing mode of the camera resource. A control mode of the camera resource allows an application to determine the characteristics of the camera resource. When an application is in a control mode of the camera resource, the application may control the parameters of the camera resource. For example, when the application is in the control mode, the application may change the characteristics or parameters, e.g., a stream format and/or other controls, on the camera resource. A sharing mode of the camera resource may allow an application to use the camera resource under the existing conditions (e.g., control may not be available to set the characteristics at which the resource is currently being used).

The camera resource log may be updated upon a change of state of each camera resource. For example, when a camera resource is opened and/or started, the camera resource may be added to the camera resource log along with information about the application that opened or started the camera resource. When additional applications join in usage of the camera resource(s), then the additional applications may be identified and added to the log. In addition, when an application is finished using a camera resource, and no other applications are using the camera resource, then the camera resource may be removed from the camera resource log.

In an implementation, activity monitors may be placed in the kernel of an operating system of the computer device to capture the usage information of the camera resources on the computer device. The activity monitors may capture the current state of each camera resource in communication with the computer device by capturing usage information related to the camera resources that reflects through the kernel. The activity monitors may publish the change of state for the camera resources and the applications using the camera resources to the camera resource log. As such, a snapshot of processes opening and/or closing camera resources in communication with a computer device may be provided with the camera resource log.

Figure 1:
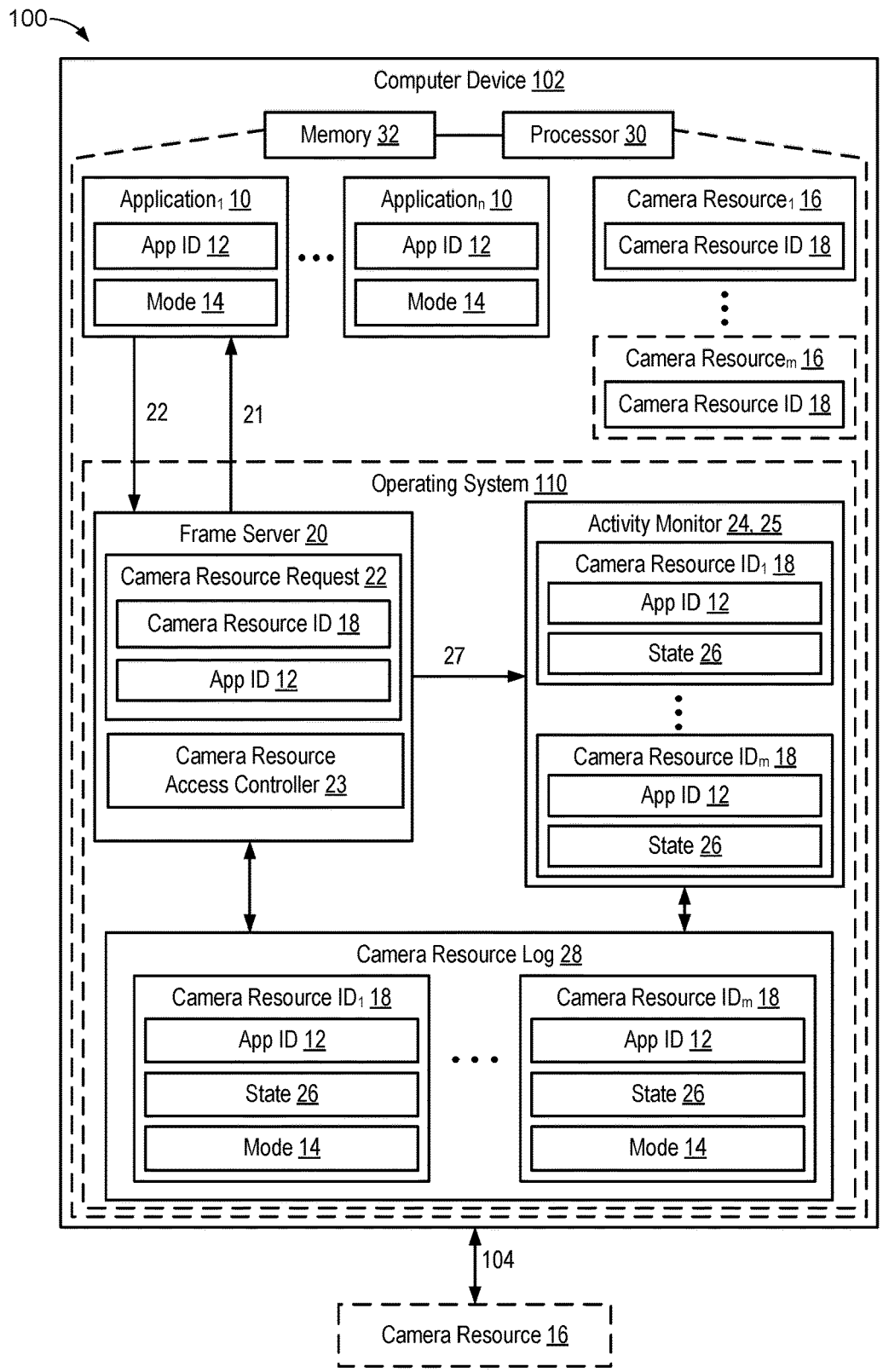
FIG. 1 is a schematic block diagram of an example computer device in accordance with an implementation of the present disclosure.

Referring now to FIG. 1, an example computer device 102 that may use one or more camera resources 16 to capture a scene and/or perform video processing may include a plurality of applications 10 (e.g., up to n applications, where n is a positive number) executed or processed by processor 30 and/or memory 32 of computer device 102. Applications 10 may use one or more camera resources 16 to capture a scene and/or perform video processing. For example, computer device 102 may have one or more camera resources 16 (e.g., up tom camera resources 16, where m is a positive number) that application(s) 10 may use. In addition, one or more camera resources 16 may be in communication with computer device 102 via a wired or wireless connection 104. Camera resources 16 in communication with computer device 102 may include, but are not limited to, virtual cameras, cameras connected via a Universal Serial Bus (USB), and a webcam. Each camera resource 16 may be associated with a camera resource identification (ID) 18 that identifies a specific camera resource 16.

In addition, application 10 may include an application identification (ID) 12 that identifies the application 10 requesting use of a camera resource 16. The application ID 12 may include, but is not limited to, a number, a name, or other unique identifier that may identify which application 10 is requesting use of a camera resource 16.

Application 10 may also have a mode 14 of use, such as a control mode or a shared mode that identifies an access application 10 may have to the camera resource 16. If the mode 14 of use is a control mode, application 10 may control the parameters of the camera resource 16. For example, when application 10 is in a control mode, application 10 may change a stream format and/or set controls on camera resource 16. In addition, when an application 10 is in a control mode of the camera resource 16, the application 10 may have control of the camera resource 16 (e.g., no other applications may have control access to the camera resource). If the mode 14 of use is a sharing mode of the camera resource 16, application 10 may use the camera resource under the existing conditions (e.g., control may not be available to set the characteristics at which the camera resource 16 is currently being used). For example, one application may control a portion of the camera resource 16 (e.g., an infrared (IR) sensor), while sharing other portions of the camera resource 16 (e.g., a color sensor) with other applications. In an example use case, a first application (e.g., the Windows Hello application) may control the IR sensor and color sensor of the camera resource 16 (e.g., Windows Hello set the controls on the camera resource 16). A second application (e.g., the Skype application) may try to initiate a video call while Windows Hello has control of the color sensor and is operating the RGB camera at a lower resolution. While Skype prefers to have a higher resolution, Skype may initiate the video call at the lower resolution that is available for sharing instead of not initiating the call.

In addition, computer device 102 may include an operating system 110 executed by processor 30 and/or memory 32 of computer device 102. Memory 32 may be configured for storing data and/or computer-executable instructions defining and/or associated with operating system 110, and processor 30 may execute operating system 110. An example of memory 32 can include, but is not limited to, a type of memory usable by a computer, such as random access memory (RAM), read only memory (ROM), tapes, magnetic discs, optical discs, volatile memory, non-volatile memory, and any combination thereof. An example of processor 30 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include a frame server 20 operable to manage one or more camera resources 16 operating on and/or in communication with computer device 102. Frame server 20 may receive one or more camera resource requests 22 from applications 10 to use at least one camera resource 16. The camera resource request 22 may include a camera resource ID 18 corresponding to a requested camera resource 16 and an application ID 12 of an application 10 requesting use of the camera resource 16. Frame server 20 may coordinate access to the one or more camera resources 16 associated with computer device 102.

Frame server 20 may include a camera resource access controller 23 that grants and/or denies access to the camera resource 16 identified in the camera resource requests 22. For example, the camera resource access controller 23 may check a camera resource log 28 for a current state 26 of the camera resource 16 to determine whether the camera resource 16 is available for use. The camera resource log 28 may include any record that can record information to indicate a state of use of the camera resource 16. If the camera resource 16 is unavailable for use, the frame server 20 may provide an access request response 21 to application 10, which in this case includes a denial of the camera resource request 22 and may notify the application 10 that that camera resource 16 is unavailable for use. When the camera resource 16 is unavailable for use, the application 10 may wait to access to the camera resource 16 and/or select a different camera resource 16 to use. For example, the camera resource 16 may be unavailable for use when an application 10 is using the camera resource 16 in a control mode. In addition, the camera resource 16 may be unavailable for use if another application 10 is using the camera resource 16 and the camera resource may be unable to facilitate a shared mode of access.

If the camera resource 16 is available for use, the frame server 20 may provide an access request response 21 to application 10, which in this case includes a grant of camera resource request 22. In addition, frame server 20 may communicate the grant of access 27 to the camera resource 16 to one or more activity monitors 24, 25 when facilitating the access to the camera resource 16. The camera resource 16 may be available for use when other applications 10 are not using the camera resource 16. In addition, the camera resource 16 may be available for use when in a shared mode of access where multiple applications 10 may use the camera resource 16 at the same time.

Figure 2:
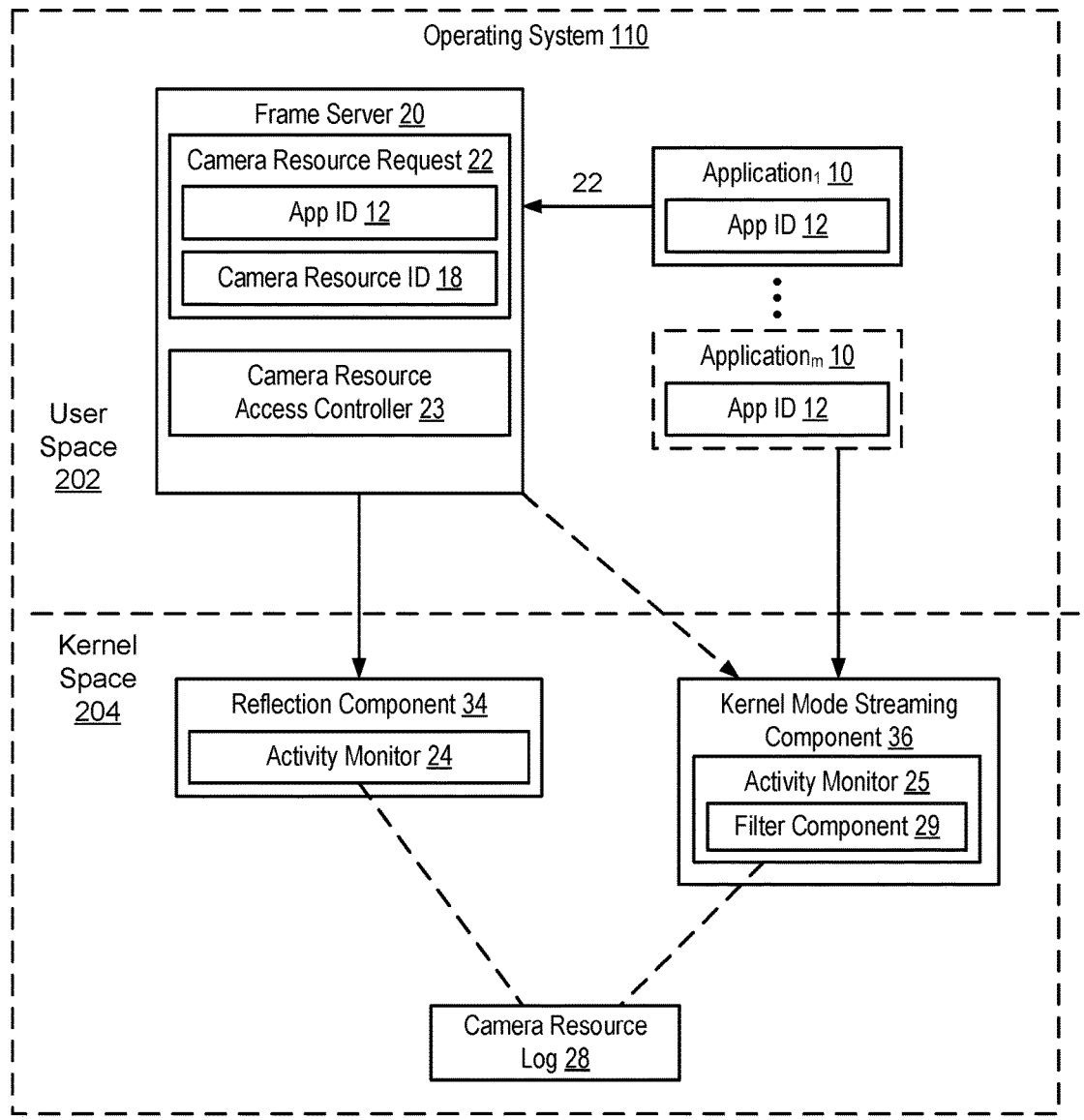
FIG. 2 is a schematic block diagram of an example operating system in accordance with an implementation of the present disclosure.

As illustrated in FIG. 2, the operating system 110 may divide the memory (e.g., memory 32 of computer device 102) into different spaces corresponding to different privilege levels, where higher privileged processes have more access to memory and services and lower privileged processes have less access to memory and services. For example, the operating system 110 may divide the memory into a user space 202 and a kernel space 204. For example, applications 10, frame server 20, and lower privileged software routines may operate in the user space 202 and higher privileged services of the operating system 110 may operate in the kernel space 204. Separating the memory into the user space 202 and the kernel space 204 may increase security, privacy, and fault tolerance of the operating system 110 by limiting memory access of potentially faulty or malicious applications.

Frame server 20 may communicate the grant of access 27 to the camera resource 16 to one or more activity monitors 24, 25 that may capture the usage information of the camera resources 16 on computer device 102 and/or in communication with computer device 102 and may update the state 26 of the camera resources 16 based on the usage information.

In an implementation, the activity monitors 24 and 25 may be placed in the kernel space 204 of the operating system 110 to capture the usage information of the camera resources 16 on the computer device 102. Activity monitors 24 and 25 may capture the current state 26 of each camera resource 16 in communication with computer device 102 by capturing information related to the camera resources 16 that reflects through the kernel space 204. Example states 26 of the camera resources 16 may include, but are not limited to, active, in use, off, and not open. For example, if a camera resource 16 is not active (e.g., an application has not requested use of the camera resource 16), the current state 26 of the camera resource 16 may be "not open." When a camera resource 16 has been requested for use by an application 10, the current state 26 of the camera resource 16 may be "active" and/or "in use." If an application 10 is finished using the camera resource 16, the current state 26 of the camera resource 16 may change to "off."

Activity monitor 24 may be placed in a reflection component 34. Frame server 20 may communicate the grant of access of the camera resources 16 in response to the camera resource requests 22 received from applications 10 to the reflection component 34. As such, activity monitor 24 may capture the camera resource processes managed by frame server 20 that are reflected through the reflection component 34.

In addition, an activity monitor 25 may be placed in a kernel mode streaming (KMS) component 36 to capture the usage information of any legacy camera resources 16 that may be in communication with computer device 102, such as an older webcam. Frame server 20 may communicate a grant of access to a camera resource 16 to KMS component 36 when the camera resource request 22 identifies a legacy camera resource 16 in communication with computer device 102 for use. In addition, an application 10 may be able to send a camera resource request 22 directly to KMS component 36 to access a legacy camera resource 16, without sending the request through the frame server 20. As such, KMS component 36 may receive communications from both the frame server 20 and applications 10.

Activity monitor 25 may optionally include a filter component 29 operable to filter camera resource requests 22 received by KMS component 36. For example, if KMS component 36 receives grant of access from frame server 20, filter component 29 may remove the grant of access from activity monitor 25 so that activity monitor 25 does not duplicate an activity that may already have been provided by frame server 20 to a camera resource log 28.

Activity monitors 24 and 25 may publish any change of state 26 for the camera resources 16 to the camera resource log 28. Thus, as camera resource requests 22 are added and/or removed (e.g., when an application is finished using a camera resource 16), the change of state 26 for the camera resources 16 may be published to the camera resource log 28.

Referring back to FIG. 1, the camera resource log 28 may include for each camera resource ID 18, an application ID 12 for the application 10 using the camera resource 16, a state 26 for the camera resource 16, and a mode 14 of use by the application 10 of the camera resource 16.

The camera resource log 28 may pro-vide a snapshot of camera resource processes opening and/or closing related to camera resources 16 in association with computer device 102. Moreover, because the activity monitors 24 publish changes of state 26 for any camera resource 16 in communication with computer device 102, the camera resource log 28 may be in synch with the changes of state 26 of the camera resources 16 and may provide a current state of operations for all camera resources 16 in communication with computer device 102. Thus, camera resource log 28 may provide a complete record of the camera resource 16 activities on computer device 102.

One example use case for the camera resource log 28 is to use the camera resource log 28 to determine a status of a particular camera resource 16. Currently, if an application 10 wants to use a camera resource 16, the application 10 initializes the camera resource 16 to check whether the camera resource 16 is available for use. If the camera resource 16 is available, the application 10 may use the camera resource 16. However, if the camera resource 16 is unavailable, the application 10 may have to wait to use the camera resource 16. Checking whether the camera resource 16 is available, may use unnecessary processing time and may be an expensive process. As such, applications 10 may use the camera resource log 28 to determine whether a camera resource 16 may be available for use and may reduce the processing time to check whether a camera resource 16 may be available for use.

Another example use case for the camera resource log 28 may include identifying spyware that may be operating on computer device 102 and/or other unauthorized uses of camera resources 16 associated with computer device 102. For example, if an application related to the spyware opens up a camera resource 16 in communication with computer device 102, camera resource log 28 may identify any camera resource(s) 16 currently in use and the application that opened the camera resource(s) 16. As such, the camera resource log 28 may be used to identify any unauthorized access to camera resources 16 associated with the computer device 102.

Referring now to FIG. 3, illustrated is an example camera resource log 28. The camera resource log 28 may include a camera resource ID 18, application ID 12, state 26, and a mode 14 of use. As illustrated, the camera resource ID 18 may identify one or more camera resources 16 (FIG. 1) operating on the computer device 102 (FIG. 1) or in communication with the computer device 102 (e.g., a web camera, a camera on a front portion of the computer device, and a camera on a rear portion of the computer device). The application ID 12 may identify one or more applications 10 (FIG. 1) that requested use of the camera resources 16.

In the illustrated example, a Skype application may use the webcam for a skype call, while an authentication application may use the front camera for authentication purposes, and a coupon application may be finished using a rear camera for capturing information for a coupon code. The state 26 may indicate the current status for each of the camera resources. For example, when the coupon application finished using the rear camera, the state 26 for the rear camera may be updated to "off."

As the status changes for each of the camera resources IDs 18 included in the camera resource log 28, the state 26 may be updated. Moreover, as additional applications 10 request use of camera resources 16, the application IDs 12 and the camera resource IDs 18 may be added to the camera resource log 28. As such, the camera resource log 28 may be dynamically updated to provide a current snapshot of the camera activity on the computer device 102.

Figure 4:
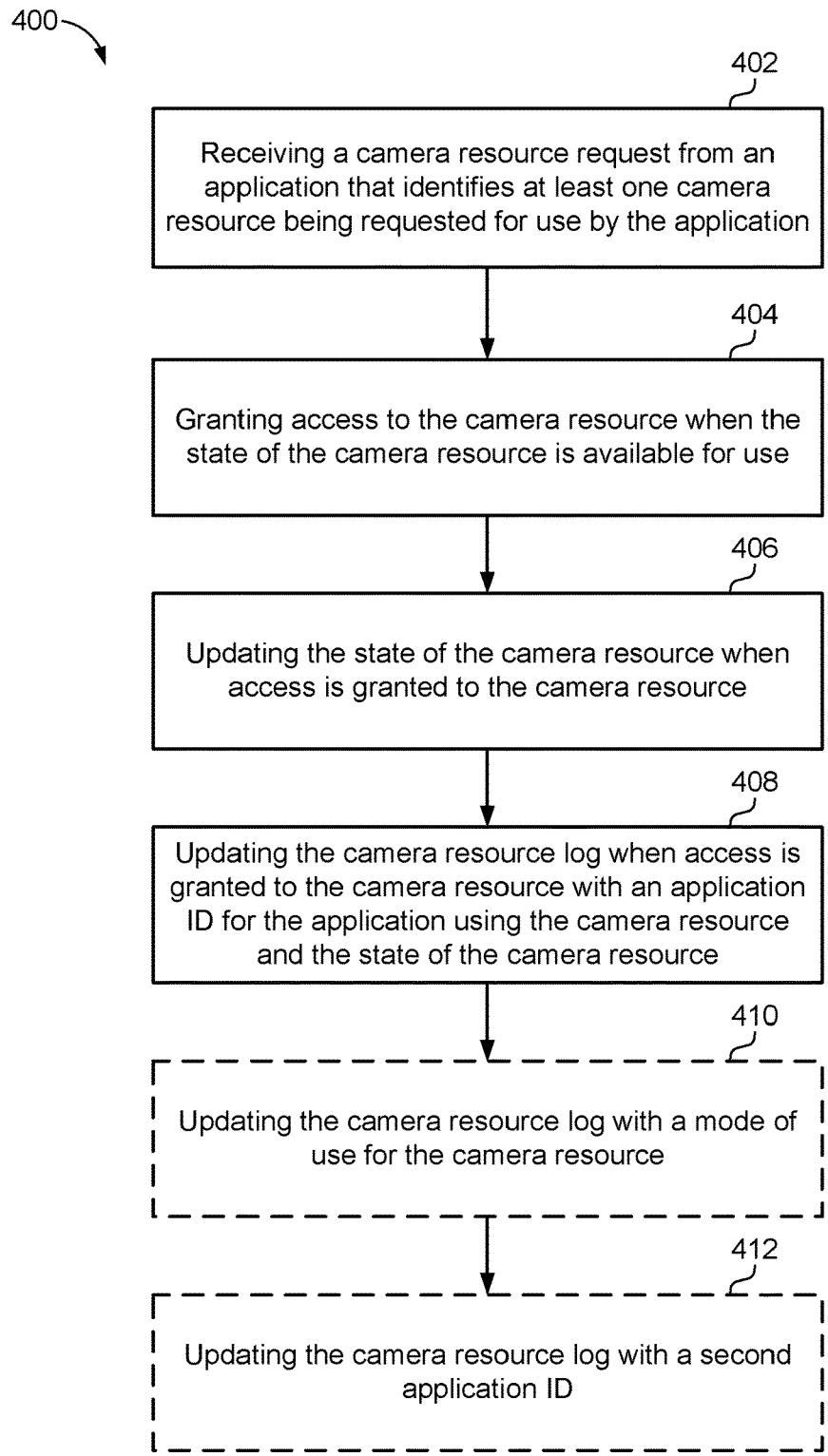
FIG. 4 is an example method flow for monitoring the activities of camera resources in accordance with an implementation of the present disclosure.

Referring now to FIG. 4, an example method 400 may be used by computer device 102 (FIG. 1) to monitor the camera resource 16 (FIG. 1) activities occurring on computer device 102.

At 402, method 400 may include receiving a camera resource request from an application that identifies at least one camera resource being requested for use by the application. For example, frame server 20 may receive one or more camera resource requests 22 from applications 10 to use at least one camera resource 16. The camera resource request 22 may include a camera resource ID 18 and an application ID 12. The camera resource ID 18 may be a number, name, or other unique identifier that may identify the selected camera resource 16. For example, the camera resource ID 18 may indicate that the selected camera resource 16 is a webcam, a camera on a front side of the computer device 102, or a camera on a rear side of the computer device.

At 404, method 400 may include granting access to the camera resource when the state of the camera resource is available for use. For example, a camera resource access controller 23 may verify whether the requested camera resource 16 is available for use. Camera resource access controller 23 may use a camera resource log 28 to ascertain a current state 26 of the camera resource 16. The camera resource log 28 may include any record that can record information to indicate a state of use of the camera resource 16. Example states 26 of the camera resources 16 may include, but are not limited to, available for use, active, in use, off, and not open.

If the camera resource 16 is unavailable for use, the frame server 20 may provide an access request response 21 to application 10, which in this case includes a denial of the camera resource request 22 and may notify the application 10 that that camera resource 16 is unavailable for use. When the camera resource 16 is unavailable for use, the application 10 may wait to access to the camera resource 16 and/or select a different camera resource 16 to use. For example, the camera resource 16 may be unavailable for use when another application is using the camera resource 16 in a control mode. In addition, the camera resource 16 may be unavailable for use if another application is using the camera resource 16 and the camera resource may be unable to facilitate a shared mode of access. As such, application 10 may wait to use the camera resource 16, while the other application continues using the camera resource 16 and/or select a different camera resource to use.

If the camera resource 16 is available for use, the frame server 20 may provide an access request response 21 to application 10, which in this case includes a grant of camera resource request 22. As such, application 10 may start using the camera resource 16, for example, in a control mode where application 10 may set the characteristics or parameters, e.g., a stream format and/or other controls, on the camera resource 16. Another example, may include application 10 receiving a shared mode of access to the camera resource 16. As such, application 10 may use the camera resource 16 under the existing conditions at which the camera resource 16 is currently being used. In addition, frame server 20 may communicate the grant of access 27 to the camera resource 16 to one or more activity monitors 24, 25 when facilitating the access to the camera resource 16. The camera resource 16 may be available for use when other applications 10 are not using the camera resource 16. In addition, the camera resource 16 may be available for use when in a shared mode of access where multiple applications 10 may use the camera resource 16 at the same time.

One or more activity monitors 24, 25 may capture the usage information of the camera resources 16 associated with computer device 102 and may update the state 26 of the camera resources 16 based on the usage information. In an implementation, activity monitors 24, 25 may be placed in the kernel space 204 of the operating system 110 to capture the usage information of the camera resources 16 associated with the computer device 102. Activity monitors 24 and 25 may capture the usage information related to the camera resources 16 associated with computer device 102 that reflects through the kernel space 204. For example, activity monitors 24 and 25 may publish any change of state 26 for the camera resources 16 to a camera resource log 28. The camera resource log 28 may include for each camera resource ID 18, an application ID 12 for the application 10 using the camera resource 16, a state 26 for the camera resource 16, and a mode 14 of use by the application 10 of the camera resource 16 (e.g., a control mode or a shared mode). As such, usage information related to the camera resources 16 may include, for example, a collection of camera activity entries, and for each camera activity entry, usage information may contain a collection of process entries. Each process entry may include, but is not limited to, Camera Device Information, Application Process ID, Camera Streaming State, Camera Streaming Mode (e.g., a mode 14 in use, such as a control mode or a shared mode), and Report Time (e.g., the time when a sensor state was changed by this specific process).

At 408, method 400 may include updating the camera resource log with an application ID for the application using the camera resource and the state of the camera resource. For example, activity monitors 24 and 25 may publish any change of state 26 for the camera resources 16 to a camera resource log 28. The camera resource log 28 may include for each camera resource ID 18, an application ID 12 for the application 10 using the camera resource 16, a state 26 for the camera resource 16, and a mode 14 of use by the application 10 of the camera resource 16 (e.g., a control mode or a shared mode). As such, the camera resource log 28 may provide a snapshot of camera resource processes opening and/or closing related to camera resources 16 in communication with computer device 102.

At 410, method 400 may optionally include updating the camera resource log with a mode of use for the camera resource. For example, activity monitors 24 and 25 may publish to the camera resource log 28 a mode 14 of use by the application 10 of the camera resource 16, such as a control mode or a shared mode that identifies an access application 10 may have to the camera resource 16. If the mode 14 of use is a control mode, application 10 may control the parameters of the camera resource 16. For example, when application 10 is in a control mode, application 10 may change a stream format and/or set controls on camera resource 16. In addition, when an application 10 is in a control mode of the camera resource 16, the application 10 may have control of the camera resource 16 (e.g., no other applications may have control access to the camera resource). If the mode 14 of use is a sharing mode of the camera resource 16, application 10 may use the camera resource under the existing conditions (e.g., control may not be available to set the characteristics at which the camera resource 16 is currently being used).

At 412, method 400 may optionally include updating the camera resource log with a second application ID, and optionally, a mode of use for the second application. For example, frame server 20 may receive a second camera resource request 22 from a second application 10 to use the camera resource 16. Frame server 20 may determine whether the camera resource 16 is available for sharing based on, for example, the mode 14 of sharing stored in the camera resource log 28 for the camera resource 16. If the mode 14 indicates that the camera resource 16 is unavailable for sharing, frame server 20 may deny the second application request for access to the camera resource 16. If the mode 14 indicates that the camera resource 16 is available for sharing, frame server 20 may grant the second application a shared mode of access to the camera resource 16. For example, frame server 20 may communicate the grant of access 27 to the second application to activity monitors 24, 25.

Activity monitors 24, 25 may update the camera resource log 28 to indicate that the second application is also using the camera resource 16. For example, the application ID of the second application may be added to a list of application IDs 12 currently using the camera resource 16. In addition, activity monitors 24, 25 may update the mode 14 of use of the second application to a shared mode of use.

As camera resource requests 22 are added and/or removed (e.g., when an application is finished using a camera resource 16) by the frame server 20, the camera resource log 28 may be updated. For example, when a camera resource 16 is opened and/or started, the camera resource 16 may be added to the camera resource log along with information about the application 10 that opened or started the camera resource 16. When additional applications 10 join in usage of the camera resource(s), the additional applications 10 may be identified and added to the camera resource log 28. For example, when the camera resource may facilitate a shared mode of access, additional applications 10 may be granted a shared mode of access to the camera resource 16. In addition, when an application 10 is finished using a camera resource 16, and no other applications are using the camera resource 16, then the camera resource 16 may be removed from the camera resource log 28.

Moreover, because the activity monitors 24 publish changes of state 26 for any camera resource 16 in communication with computer device 102, the camera resource log 28 may be in synch with the changes of state 26 and may provide a current state of operations of all camera resources 16 in communication with computer device 102. Thus, camera resource log 28 may provide a complete record of the camera resource 16 activities on computer device 102.

Figure 5:
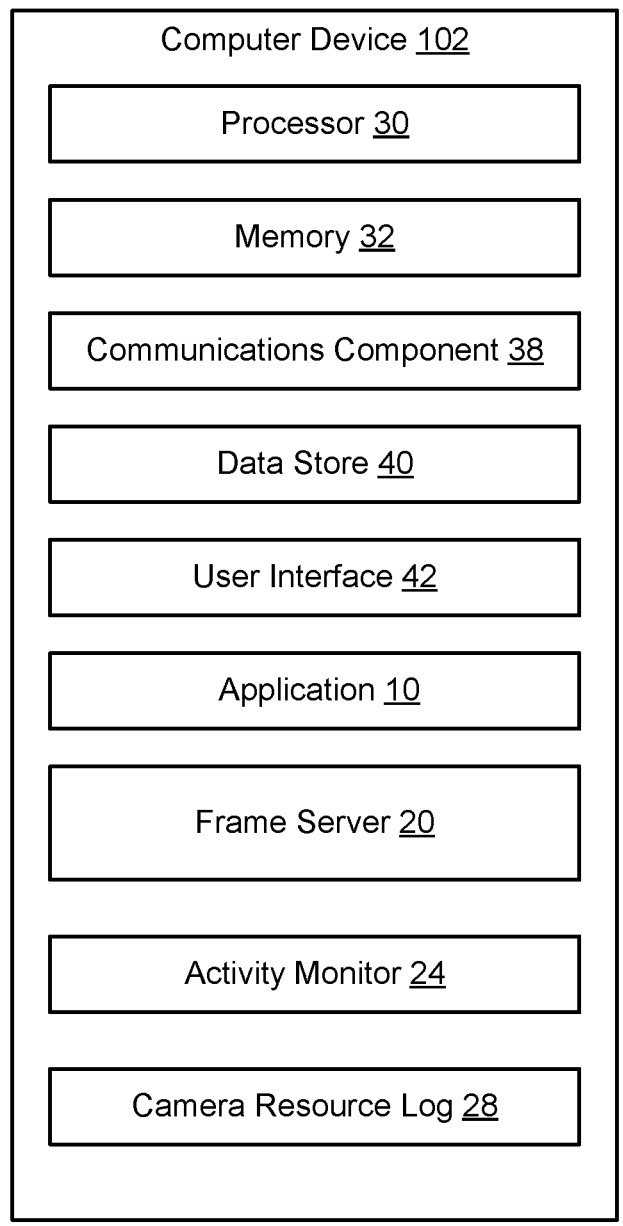
FIG. 5 is a schematic block diagram of an example device in accordance with an implementation of the present disclosure.

Referring now to FIG. 5, illustrated is an example computer device 102 in accordance with an implementation, including additional component details as compared to FIG. 1. In one example, computer device 102 may include processor 30 for carrying out processing functions associated with one or more of components and functions described herein. Processor 30 can include a single or multiple set of processors or multi-core processors. Moreover, processor 30 can be implemented as an integrated processing system and/or a distributed processing system.

Computer device 102 may further include memory 32, such as for storing local versions of applications being executed by processor 30. Memory 32 can include a type of memory usable by a computer, such as random access memory (RAM), read only memory (ROM), tapes, magnetic discs, optical discs, volatile memory, non-volatile memory, and any combination thereof. Additionally, processor 30 and memory 32 may include and execute operating system 110 (FIG. 1).

Further, computer device 102 may include a communications component 38 that provides for establishing and maintaining communications with one or more parties utilizing hardware, software, and services as described herein. Communications component 38 may carry communications between components on computer device 102, as well as between computer device 102 and external devices, such as devices located across a communications network and/or devices serially or locally connected to computer device 102. For example, communications component 38 may include one or more buses, and may further include transmit chain components and receive chain components associated with a transmitter and receiver, respectively, operable for interfacing with external devices.

Additionally, computer device 102 may include a data store 40, which can be any suitable combination of hardware and/or software, that provides for mass storage of information, databases, and programs employed in connection with implementations described herein. For example, data store 40 may be a data repository for applications 10 (FIG. 1), frame server 20 (FIG. 1), activity monitors 24, 25 (FIG. 1), and/or camera resource log (FIG. 1).

Computer device 102 may also include a user interface component 42 operable to receive inputs from a user of computer device 102 and further operable to generate outputs for presentation to the user. User interface component 42 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 42 may include one or more output devices, including but not limited to a display, a speaker, a haptic feedback mechanism, a printer, any other mechanism capable of presenting an output to a user, or any combination thereof.

In an implementation, user interface component 42 may transmit and/or receive messages corresponding to the operation of applications 10, frame server 20, activity monitors 24, 25, and/or camera resource log. In addition, processor 30 executes applications 10, frame server 20, activity monitors 24, 25, and/or camera resource log and memory 32 or data store 40 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:
1. A computer device, comprising:
a memory to store data and instructions;
a processor in communication with the memory;

an operating system in communication with the memory and the processor, wherein the operating system is operable to:
- receive a camera resource request from an application that identifies at least one camera resource being requested for use by the application;
- determine whether the at least one camera resource is available for use by checking a camera resource log that provides a current state of the at least one camera resource and a mode of use of the at least one camera resource, wherein the current state includes an in use state and the mode of use includes a shared mode or a control mode, wherein the control mode enables a controlling application to determine existing characteristics of the at least one camera resource, and wherein the shared mode allows a requesting application to use the at least one camera resource under the existing characteristics of the at least one camera resource;
- grant the application access to the at least one camera resource in response to the current state of the at least one camera resource being in use and the mode of use being the shared mode;
- update the current state of the at least one camera resource in response to the application being granted access to the at least one camera resource; and
- update the camera resource log, in response to the application being granted access to the at least one camera resource, with an application identification (ID) for the application and the mode of use of the at least one camera resource by the application.

2. The computer device of claim 1, wherein the current state of the at least one camera resource further includes one or more of available for use, active, or off.

3. The computer device of claim 2, wherein the operating system is further operable to deny access to the at least one camera resource when the current state of the at least one camera resource is in use.

4. The computer device of claim 1, wherein the operating system is further operable to:
- update the current state of the at least one camera resource when the application is finished using the at least one camera resource from in use to available; and
- update the camera resource log with the current state.

5. The computer device of claim 1, wherein the operating system is further operable to update the current state of the at least one camera resource by using at least one activity monitor to capture camera resource usage information reflected through a kernel space of the operating system.

6. The computer device of claim 1, wherein the operating system is further operable to:
- determine the mode of use by the application of the at least one camera resource.

7. The computer device of claim 6, wherein the operating system is further operable to:
- receive a second camera resource request from a second application to use the at least one camera resource;
- determine whether the at least one camera resource is available for sharing based on the mode of sharing stored for the at least one camera resource in the camera resource log; and
- grant the second application the shared mode of access to the at least one camera resource in response to the at least one camera resource being available for sharing.

8. The computer device of claim 7, where in the operating system is further operable to:
- update the camera resource log for the at least one camera resource to include a second application ID for the second application and to indicate the shared mode of use by the second application associated with a camera resource ID for the at least one camera resource.

9. The computer device of claim 1, wherein the operating system is further operable to identify an unauthorized access of the at least one camera resource using the camera resource log.

10. A method for monitoring camera resource activities, comprising:
- receiving, at an operating system executing on a computer device, a camera resource request from an application that identifies at least one camera resource being requested for use by the application;
- determining whether the at least one camera resource is available for use by checking a a camera, resource log that provides a current state of the at least one camera resource and a mode of use of the at least one camera resource, wherein the current state includes an in use state and the mode of use includes a shared mode or a control mode, wherein the control mode enables a controlling application to determine existing characteristics of the at least one camera resource, and wherein the shared mode allows a requesting application to use the at least one camera resource under the existing characteristics of the at least one camera resource;
- granting the application access to the at least one camera resource in response to the current state of the at least one camera resource being in use and the mode of use being the shared mode;
- updating the current state of the at least one camera resource in response to the application being granted access to the at least one camera, resource; and
- updating the camera resource log, in response to the application being granted access to the at least one camera resource, with an application identification (ID) for the application and the mode of use of the at least one camera resource by the application.

11. The method of claim 10, wherein the current state of the at least one camera resource further includes one or more of available for use, active, or off.

12. The method of claim 10, further comprising:
- denying access to the at least one camera resource when the current state of the at least one camera resource is in use.

13. The method of claim 10, further comprising:
- updating the current state of the at least one camera resource when the application is finished using the at least one camera resource from in use to available; and
- updating the camera resource log with the current state.

14. The method of claim 10, wherein updating the current state of the at least one camera resource further comprises using at least one activity monitor to capture camera resource usage information reflected through a kernel space of the operating system.

15. The method of claim 10, further comprising:
- determining the mode of use by the application of the at least one camera resource.

16. The method of claim 15, further comprising:
- receiving a second camera resource request from a second application to use the at least one camera resource;
- determining whether the at least one camera resource is available for sharing based on mode of sharing stored for the at least one camera resource in the camera resource log;
- granting the second application the shared mode of access to the at least one camera resource in response to the at least one camera resource being available for sharing.

17. The method of claim 16, further comprising:
updating the camera resource log for the at least one camera resource to include a second application ID for the second application and to indicate the shared mode of use by the second application associated with a camera resource ID for the at least one camera resource.

18. A non-transitory computer-readable instructions executable by a computer device, comprising:
- at least one instruction for causing the computer device to receive a camera resource request from an application that identifies at least one camera resource being requested for use by the application;
- at least one instruction for causing the computer device to determine whether the at least one camera resource is available for use by checking a camera resource log that provides a current state of the at least one camera resource and a mode of use of the at least one camera resource, wherein the current state includes an in use state and the mode of use includes a shared mode or a control mode, wherein the control mode enables a controlling application to determine existing characteristics of the at least one camera resource, and wherein the shared mode allows a requesting application to use the at least one camera resource under the existing characteristics of the at least one camera resource;
- at least one instruction for causing the computer device to grant the application access to the at least one camera resource in response to the current state of the at least one camera resource being in use and the mode of use being the shared mode;
- at least one instruction for, causing the computer device to, update the current state of the at least one camera resource in response to the application being granted access to the at least one camera resource; and
- at least one instruction for causing the computer device to update the camera resource, log, in response to the application being granted access to the at least one camera resource, with an application identification (ID) for the application and the mode of use of the at least one camera resource by the application.

* * * * *